(12) United States Patent
Mizosoe et al.

(10) Patent No.: US 9,661,323 B2
(45) Date of Patent: May 23, 2017

(54) METHOD OF ENCODING PICTURE AND PICTURE ENCODING DEVICE

(71) Applicant: HITACHI MAXELL, LTD., Osaka (JP)

(72) Inventors: Hiroki Mizosoe, Tokyo (JP); Hironori Komi, Tokyo (JP); Mitsuhiro Okada, Tokyo (JP); Manabu Sasamoto, Tokyo (JP)

(73) Assignee: HITACHI MAXELL, LTD., Osaka (JP)

( * ) Notice: Subject to any disclaimer, the term of this patent is extended or adjusted under 35 U.S.C. 154(b) by 315 days.

(21) Appl. No.: 14/368,590

(22) PCT Filed: Jan. 11, 2013

(86) PCT No.: PCT/JP2013/050354
§ 371 (c)(1),
(2) Date: Jun. 25, 2014

(87) PCT Pub. No.: WO2013/105621
PCT Pub. Date: Jul. 18, 2013

(65) Prior Publication Data
US 2014/0314145 A1    Oct. 23, 2014

(30) Foreign Application Priority Data

Jan. 11, 2012 (JP) .................................. 2012-002693

(51) Int. Cl.
*H04N 7/12* (2006.01)
*G06K 9/36* (2006.01)
(Continued)

(52) U.S. Cl.
CPC ....... *H04N 19/0009* (2013.01); *H04N 19/124* (2014.11); *H04N 19/15* (2014.11); *H04N 19/176* (2014.11); *H04N 19/149* (2014.11)

(58) Field of Classification Search
CPC ............ H04N 19/0009; H04N 19/176; H04N 19/149; H04N 19/124
See application file for complete search history.

(56) References Cited

U.S. PATENT DOCUMENTS

| 5,016,010 | A | 5/1991 | Sugiyama |
| 7,496,142 | B2 * | 2/2009 | Hui ...................... H04N 19/176 375/240 |

(Continued)

FOREIGN PATENT DOCUMENTS

| JP | 2-194734 A | 8/1990 |
| JP | 3-263927 A | 11/1991 |

(Continued)

*Primary Examiner* — Dave Czekaj
*Assistant Examiner* — Tsion B Owens
(74) *Attorney, Agent, or Firm* — Baker Botts L.L.P.

(57) ABSTRACT

A buffering delay can be reduced and moving picture encoding in low delay is performed while deterioration of picture quality is minimized.

A quantization step of performing quantization of input information based on a value of a quantization parameter and decreasing an amount of information; an entropy encoding step of performing entropy encoding processing with respect to an output of the quantization step, and outputting a code generated as a result of the processing and information of a code amount generated as a result of the processing; and a rate control step of determining a value of a quantization parameter based on a result of the information of a generated code amount are provided, and the rate control step makes, for each section smaller than one picture, the value of a quantization parameter large when bit allocation in the section is expected to exceed a predetermined value, and makes the value of a quantization parameter small when the bit allocation in the section is expected to fall below the predetermined value.

5 Claims, 2 Drawing Sheets

(51) Int. Cl.
*H04N 19/124* (2014.01)
*H04N 19/176* (2014.01)
*H04N 19/15* (2014.01)
*H04N 19/149* (2014.01)

(56) References Cited

U.S. PATENT DOCUMENTS

| | | | |
|---|---|---|---|
| 9,071,841 B2* | 6/2015 | Holcomb | H04N 19/172 |
| 2007/0071094 A1* | 3/2007 | Takeda | H04N 19/197 375/240.04 |
| 2008/0123738 A1* | 5/2008 | Katsavounidis | H04N 19/159 375/240.01 |
| 2008/0304564 A1* | 12/2008 | Kim | H04N 19/197 375/240.03 |
| 2012/0002724 A1* | 1/2012 | Klim | H04N 19/176 375/240.03 |

FOREIGN PATENT DOCUMENTS

| | | |
|---|---|---|
| JP | 10-4546 A | 1/1998 |
| JP | 2000-217114 A | 8/2000 |

* cited by examiner

METHOD OF ENCODING PICTURE AND PICTURE ENCODING DEVICE

TECHNICAL FIELD

The present invention relates to a method of encoding a picture and a picture encoding device.

BACKGROUND ART

The moving picture compression standard H.264 is used in many applications because of its high compression efficiency. Meanwhile, a need for low-delay picture compression has been increasing for applications, such as video conferences and video transmission.

In encoding a video, the number of bits necessary for encoding one picture varies picture by picture. Reasons thereof include differences in complexity of patterns among scenes and pictures of the video, differences in parameters such as picture coding types among pictures, and factors deriving from statistical nature of entropy encoding. The entropy encoding is a method of improving efficiency to express information by allocating a code having a shorter bit length for more frequently appearing information.

On the other hand, when an encoded bitstream is transmitted, a bandwidth of a capacity of a transmission channel is usually limited. Therefore, it is necessary to smooth bitrate fluctuation before sending the bitstream to the transmission channel by inserting a buffer as illustrated in FIG. 2. Similarly, the buffer is also necessary at a decoder side in order to supply a required amount of bits to a decoder at the moment to decode each frame in a timely manner. The buffer at the decoder side needs to have at least the same size as that at an encoder side. As a result, a buffering delay becomes double in total.

In a case of a professional-use system, such as facilities of broadcasting stations, the bitrate fluctuation can be tolerated to a certain degree because a relatively high transmission bandwidth is available. However, considering consumer-use applications, an available transmission bandwidth is much more limited, and thus such bitrate fluctuation causes more serious impact on a transmission delay. Therefore, how reducing a buffering delay is a key to realize low delay, especially in a consumer-use system.

As a background technology of the field of the present technology, there is JP 02-194734 A (PTL 1). This publication describes that "a method of controlling an amount of encoded output data, for performing highly efficient encoding by controlling an amount of data such that the amount of encoded output data in each predetermined given section falls within a given value, is provided, the method including: a means to predict the amount of data using a section shorter than the predetermined given section as a unit; a means to control encoding processing such that a total of amounts of prediction data in the predetermined given section based on the amount of prediction data obtained by the prediction means becomes constant; and a means to accumulate a difference between the amount of prediction data obtained by the prediction means and an amount of actually encoded data, and to control the encoding processing based on an accumulation result" (see Solution to Problem).

CITATION LIST

Patent Literature

PTL 1: JP 02-194734 A

SUMMARY OF INVENTION

Technical Problem

As described in Background Art, suppression of a buffering delay is important in moving picture compression for performing low-delay transmission. PTL 1 discloses an invention to control the amount of data such that the amount of encoded output data in each given section falls within a given value. Suppressing of the fluctuation of a code amount as much as possible and making of the code amount in each given section as uniform as possible are effective to some extent for suppression of a buffering delay. However, in that case, the buffering delay cannot be suppressed to be the size of the section or less, and thus there is a problem that the low delay has its own limits.

Solution to Problem

To solve the above problem, for example, a configuration described in claims is employed.

While the present application includes a plurality of means to solve the above problem, an example of the plurality of means includes: "a quantization step of performing quantization of input information based on a value of a quantization parameter and decreasing an amount of information; an entropy encoding step of performing entropy encoding processing with respect to an output of the quantization step, and outputting a code generated as a result of the processing and information of a code amount generated as a result of the processing; and a rate control step of determining a value of a quantization parameter based on a result of the information of a generated code amount, wherein the rate control step makes, for each section smaller than one picture, the value of a quantization parameter large when bit allocation in the section is expected to exceed a predetermined value, and makes the value of a quantization parameter small when the bit allocation in the section is expected to fall below the predetermined value".

Further, an example of the plurality of means includes: "a quantization step of performing quantization of input information based on a value of a quantization parameter and decreasing an amount of information; an entropy encoding step of performing entropy encoding processing with respect to an output of the quantization step, and outputting a code generated as a result of the processing and information of a code amount generated as a result of the processing; a first rate control step of determining a value of a first quantization parameter based on a result of the information of a generated code amount; and a second rate control step of determining a value of a second quantization parameter based on a result of the information of a generated code amount and information of an amount of target delay and of a maximum transmission rate, wherein the quantization step performs quantization based on an either larger value of a quantization parameter of the first quantization parameter and the second quantization parameter".

Advantageous Effects of Invention

According to the present invention, a buffering delay can be reduced and encoding of a moving picture in low delay can be performed while deterioration of picture quality is minimized.

DESCRIPTION OF EMBODIMENTS

Embodiment 1

Figure 1:
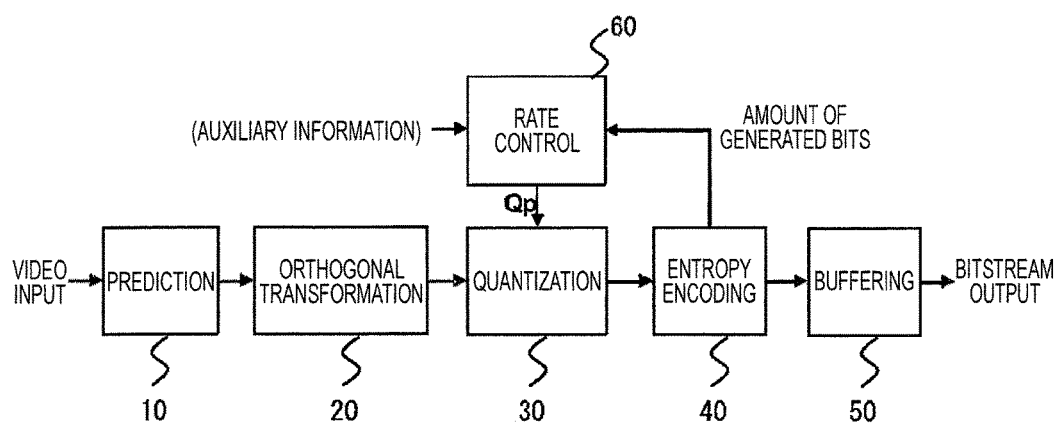
FIG. 1 is an example of a configuration diagram of a picture encoding device.
Figure 2:
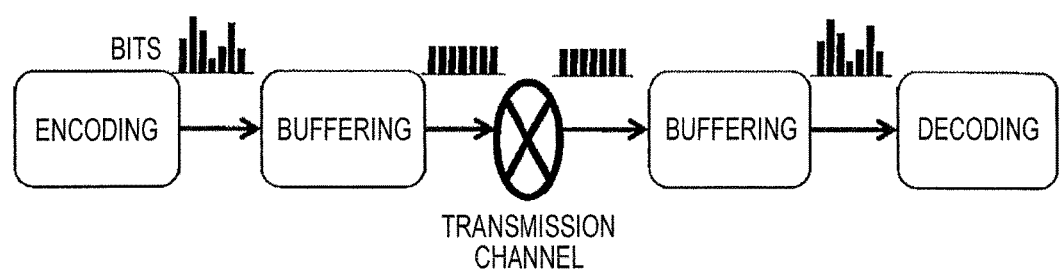
FIG. 2 is a diagram describing an example of bitrate smoothing by a buffer.

FIG. 1 is an example of a configuration diagram of a picture encoding device of the present embodiment.

When a video is input to the picture encoding device, a video signal is input to a prediction unit 10.

The prediction unit 10 performs prediction processing, such as motion prediction to predict a picture to be encoded from a reference picture stored in a memory not illustrated or intra prediction to perform prediction inside a picture to be encoded. A picture subjected to the prediction processing is output to an orthogonal transformation unit 20.

The orthogonal transformation unit 20 applies orthogonal transformation processing to an input picture, such as integer transform or discrete cosine transform. A picture subjected to the orthogonal transformation processing is output to a quantization unit 30. The quantization unit 30 applies quantization processing to an input picture. The quantization processing is performed based on a value of a quantization parameter Qp output from a rate control unit 60. A picture subjected to the quantization processing is output to an entropy encoder 40.

The entropy encoder 40 applies entropy encoding processing to the input picture, such as Huffman coding or arithmetic coding.

A picture to be encoded output from the entropy encoder 40 is subjected to buffering processing in a buffer unit 50, and is then output as a bitstream.

The picture encoding device in the present embodiment includes a feedback loop for controlling a bitrate, among the quantization unit 30, the entropy encoder 40, and the rate control unit 60. The entropy encoder 40 outputs information related to an amount of encoded bits, such as the number of bits of a result of the entropy encoding processing or the number of prediction bits in each predetermined processing unit, to the rate control unit 60.

The rate control unit 60 calculates information of a code amount generated up to the timing using the information related to the amount of encoded bits output from the entropy encoder 40. An example of the information of a code amount includes information, such as an accumulation value of the number of bits from a head of the picture, and an accumulation value of the number of bits for each predetermined section for performing rate control. The rate control unit 60 determines a value of the quantization parameter Qp based on the calculated information of a code amount, and auxiliary information, such as complexity of a picture in a region to be encoded, as needed, and outputs the value to the quantization unit 30.

From a viewpoint of low delay, it is ideal to make bit allocation in a picture as uniform as possible in order to reduce a buffering delay and minimize a delay.

Therefore, when the value of the quantization parameter Qp is determined in the rate control unit 60, the value of Qp may be controlled such that the bit allocation can be made uniform in each section sufficiently smaller than one picture (a frame or a field). Here, the section may be set in a region of N lines (N is an integer of 1 or more), the line being configured from macroblocks arranged side by side by the width of one picture, and in a region less than one picture. For example, the region may be one line of macroblock, two lines of macroblock, or three lines of macroblock. In that case, the bit allocation can be made uniform by making the value of Qp large when the amount of bits are more likely to exceed a bit allocation target in the section, and by making the value of Qp small when the amount of bits fall below the target.

According to the above-described embodiment, the fluctuation of the amount of bits is made uniform, the amount of delay in the buffer unit 50 is minimized, and the low delay can be realized.

Embodiment 2

From the viewpoint of low delay, it is desirable to make the bit allocation in a picture as uniform as possible in order to reduce a buffering delay and minimize a delay. However, when the amount of bits is simply made uniform, the uniformization may cause a decrease in picture quality.

Therefore, in the present embodiment, an example of a picture encoding device will be described, which realizes a target amount of delay or less while suppressing the decrease in picture quality by tolerating fluctuation of the amount of bits generated in each section sufficiently smaller than one picture to some extent.

Figure 3:
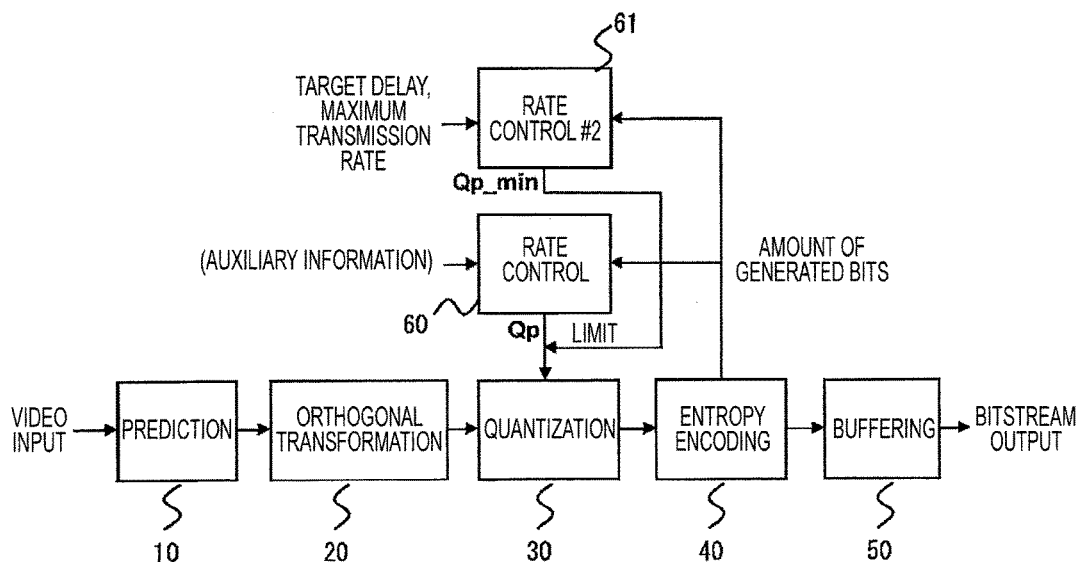
FIG. 3 is an example of a configuration diagram of a picture encoding device.

FIG. 3 is an example of a configuration diagram of a picture encoding device of the present embodiment.

Description of parts having the same details as the embodiment 1 is omitted.

A difference of the present embodiment from the embodiment 1 is that a second rate control unit 61 is provided. The second rate control unit 61 controls "the amount of carryover bits".

The "amount of carryover bits" will be described with reference to FIG. 4.

Figure 4:
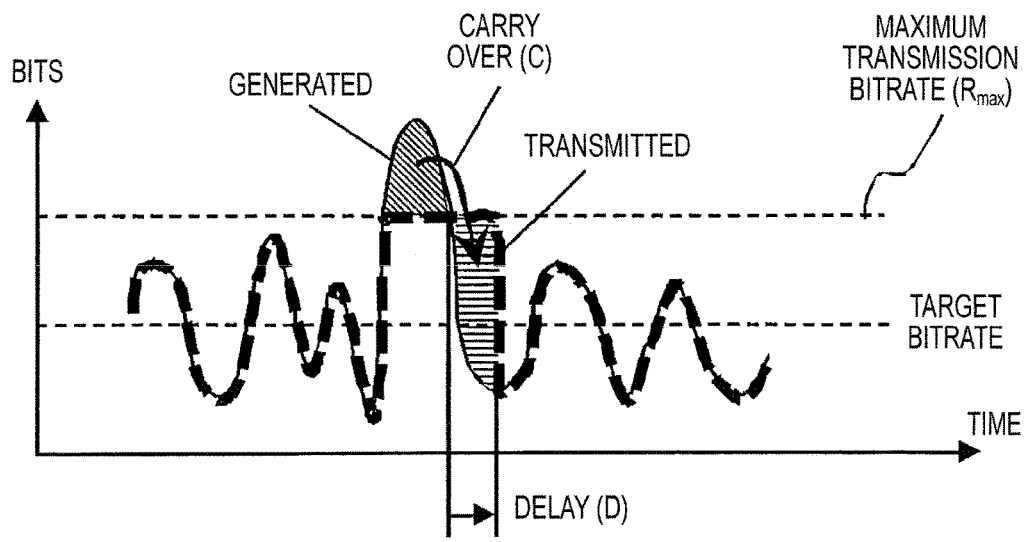
FIG. 4 is a diagram describing the amount of carryover bits.

The horizontal axis of FIG. 4 represents passage of time associated with encoding (such as a frame number or a line number in a picture), and the vertical axis represents a code amount per unit time. The thin solid line indicates a code amount generated at each timing as a result of encoding of a part of a sequence or a part of a picture in each time in the horizontal axis.

The complexity of patterns and intensity of movement differ depending on scenes and pictures, and the degree of local complexity of a picture is changed within one picture. Therefore, the amount of bits generated as a result of encoding has fluctuation in code amount among pictures. Further, similarly, fluctuation in code amount exists within one picture.

The bits generated at each timing of encoding are sent out to a transmission channel. If the generation amount is within a maximum transmission bitrate, the bits are immediately sent out. However, if the generation amount temporarily exceeds the maximum transmission bitrate, the bits are not immediately sent out, and the exceeded portion is stored in a buffer as the "carryover bits", and is sent out afterwards. The thick broken line indicates an actually transmitted code amount. The carryover bits stay in the buffer until all of the carryover bits are sent out, which results in a buffering delay.

In this way, the fluctuation of the generated code amount in encoding and the amount of carryover bits as a result of the encoding bring about a buffering delay. However, if the amount of carryover bits is controlled to stay within a certain limit amount, the buffering delay time can be caused to stay within a predetermined range even if the existence of the carryover bits is dared to tolerate.

In the present embodiment, the fluctuation of the amount of bits is intentionally tolerated, and the picture quality can be maintained as much as possible.

A method of controlling the amount of carryover bits will be described in detail. In FIG. 4, a delay time D caused by the carryover bits is expressed like the expression (1):

$$D=C/R\text{max} \quad (1)$$

Here, D is a delay time [s], C is the amount of carryover bits [bit], and Rmax is a maximum transmission bitrate [bps] of the transmission channel. An amount of maximum carryover bits Cmax is expressed like the expression (2) using a target maximum delay Dmax [s]:

$$C\text{max}=D\text{max}\cdot R\text{max} \quad (2)$$

Cmax is a maximum tolerable value [bit] of the amount of carryover bits. Note that calculation of the amount of carryover bits C is performed in each predetermined section sufficiently smaller than one picture. The section is set in a region of N lines of macroblocks (N is an integer of 1 or more), and in a region less than one picture, similarly to the embodiment 1. For example, the region may be a one macroblock line, two macroblock lines, or three macroblock lines. In this way, the amount of carryover bits C is controlled to satisfy the expression (3) at each timing of bit generation of the encoding.

$$C \leq C\text{max} \quad (3)$$

At that time, a maximum value of the amount of carryover bits C is limited like the expression (3). However, when the amount of carryover bits is less than the maximum value, generation of the fluctuation is controlled to be tolerated.

Further, the method of controlling the maximum value of the amount of carryover bits C will be described in detail, referring back to FIG. 3.

The second rate control unit 61 controls the amount of carryover bits. Information related to the amount of encoded bits is supplied from an entropy encoder, and information such as the maximum transmission bitrate (Rmax) and the target delay (Dmax) is stored in a storage unit not illustrated, and is separately supplied to the second rate control unit 61.

The second rate control unit 61 obtains a value of a minimum quantization parameter Qp_min based on the information related to the amount of encoded bits, the maximum transmission bitrate (Rmax), and the target delay (Dmax).

The minimum quantization parameter value Qp_min is a minimum value of the quantization parameter value Qp for causing the amount of carryover bits not to exceed a predetermined value determined from the maximum transmission bitrate and the target delay.

A lower limit of the quantization parameter Qp used by a quantization unit 30 for quantization of an input picture is limited by the value of Qp_min. That is, in a case of Qp>Qp_min, the quantization of a picture is performed using the quantization parameter Qp supplied from the rate control unit 60, and in a case of Qp≤Qp_min, the quantization of a picture is performed using the value of the minimum quantization parameter Qp_min.

With this control, while the lower limit of Qp is limited by Qp_min, fluctuation of the value of Qp for maintaining the picture quality as much as possible is tolerated in other cases.

Note that, in the present embodiment, the lower limit value of Qp is limited by Qp_min. Therefore, when the value of the quantization parameter Qp is determined by the rate control unit 60, the value of Qp is not necessarily controlled such that the bit allocation is made uniform in each section sufficiently smaller than one picture, like the embodiment 1.

For example, to realize low delay while suppressing a decrease in the picture quality when a video is transmitted, where a length of the video in the vertical direction is about X lines of macroblocks (X may be a decimal fraction) and the frame rate is Y (fps), the above-described predetermined section (the region of N lines of macroblocks) and the maximum delay time Dmax [s] may be set to satisfy a relationship of the following expression (4):

$$N<D\text{max}\times Y\times X<X \quad (4)$$

With the setting like the expression (4), the maximum delay time Dmax is larger than a processing time of the region of N lines of macroblocks, which is the above-described predetermined section, and thus the fluctuation of the amount of carryover bits C can be tolerated, and the decrease in the picture quality due to the low delay can be reduced. In addition, the maximum delay time Dmax becomes shorter a processing time of the region of X lines of macroblocks=1 frame, and thus the low delay less than one frame can be realized.

Further, more favorably, the above-described predetermined section (the region of N lines of macroblocks) and the maximum delay time Dmax [s] may be set to satisfy a relationship of the following expression (5):

$$N<D\text{max}\times Y\times X<20 \text{(note that } 1 \leq N \leq 4) \quad (5)$$

With the setting like the expression (5), the maximum delay time Dmax is set to be larger than the processing time of the region of N lines of macroblocks, which is the above-described predetermined section, and to be less than a processing time of a region of 20 lines of macroblocks. With the setting, even if the above-described predetermined section is four lines of macroblocks, for example, the fluctuation of the amount of carryover bits C can be tolerated in a processing time of about five times the number of lines, and thus the decrease in the picture quality due to the low delay can be sufficiently reduced. Further, for example, when a video of 720 pixels in the vertical direction is encoded with a 16-pixel square of the macroblock size, the size in the vertical direction is 45 lines of macroblocks. Therefore, the processing time is about 0.44 frames with respect to the processing time of the region of 20 lines of macroblocks, and thus low delay can be sufficiently realized. When a video of 1080 pixels in the vertical direction is coded with a 16 pixel square of the macroblock size, the size in the vertical direction is 67.5 lines of macroblocks. Therefore, the processing time is about 0.3 frames with respect to the processing time of the region of 20 lines of macroblocks, and thus low-delay can be sufficiently realized.

As described above, according to the present embodiment, the buffering delay can be reduced and the encoding of a moving picture with low-delay can be performed while the deterioration of the picture quality is minimized.

REFERENCE SIGNS LIST 10 prediction unit
20 orthogonal transformation unit
30 quantization unit
40 entropy encoder
50 buffer unit
60 rate control unit
61 second rate control unit

The invention claimed is:

1. A method of generating an encoded moving picture, the method comprising:
   a quantization parameter determination step of determining a quantization parameter;
   an encoding step of encoding a moving picture using the determined quantization parameter and generating an encoded bit; and
   an outputting step of outputting the encoded bit generated in the encoding step,
   wherein, in an encoded stream output in the outputting step in a predetermined section unit smaller than one frame, an amount of generated bits larger than a first amount of bits corresponding to a predetermined bitrate is tolerated, and in each section of the predetermined section unit, a difference between the amount of generated bits and the first amount of bits is a second amount of bits or less,
   wherein the second amount of bits is a product of the predetermined bitrate and a predetermined delay time.

2. The method of generating an encoded moving picture according to claim 1, wherein X, N, Y, and D of an encoded video to be transmitted satisfy a relationship of N<D×Y×X<X where a length in a vertical direction is a size of X lines of macroblocks, a frame rate is Y (fps), the predetermined section is a region of N lines of macroblocks, and the predetermined delay time is D (sec).

3. The method of generating an encoded moving picture according to claim 1, wherein an encoded video to be transmitted satisfies a relationship of N<D×Y×X<20 (note that 1≤N≤4) where a length in a vertical direction is a size of X lines of macroblocks, a frame rate is Y (fps), the predetermined section is a region of N lines of macroblocks, and the predetermined delay time is D (see).

4. A method of encoding a moving picture, the method comprising:
   a quantization step of performing quantization of input information based on a value of a quantization parameter and decreasing an amount of information;
   an encoding step of performing encoding processing with respect to an output of the quantization step, and outputting a generated code as a result of the encoding processing and information of a code amount generated as a result of the processing; and
   a first rate control step of determining a value of a first quantization parameter based on a result of the information of a generated code amount; and
   a second rate control step of determining a value of a second quantization parameter based on the information of a generated code amount and information of an amount of target delay and of a maximum transmission rate,
   wherein the quantization step performs quantization based on an either larger value of a quantization parameter of the first quantization parameter and the second quantization parameter.

5. A moving picture encoding device that encodes a moving picture, comprising:
   a quantization unit configured to perforin quantization of input information based on a value of a quantization parameter, and to decrease an amount of information;
   an encoder configured to perform encoding processing with respect to an output from the quantization unit, and to output a code generated as a result of the processing and information of a code amount generated as a result of the processing;
   a first rate control unit configured to determine a value of a first quantization parameter based on the information of a generated code amount; and
   a second rate control unit configured to determine a value of a second quantization parameter based on the information of a generated code amount and information of an amount of target delay and of a maximum transmission rate,
   wherein the quantization unit performs quantization based on an either larger value of a quantization parameter of the first quantization parameter and the second quantization parameter.

* * * * *